April 1, 1952  J. J. TOMEO  2,591,318
ADJUSTABLE MIRROR BRACKET
Filed Aug. 18, 1950  2 SHEETS—SHEET 1
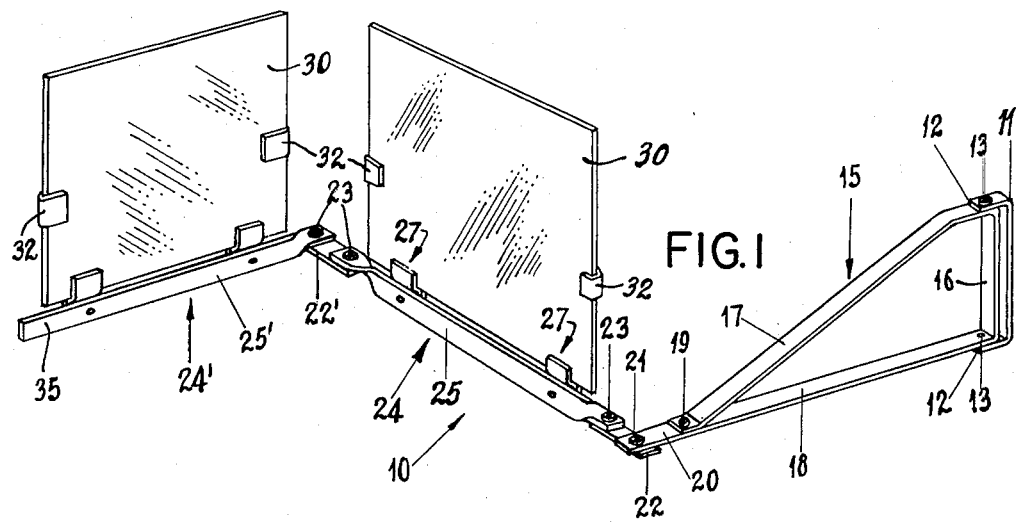
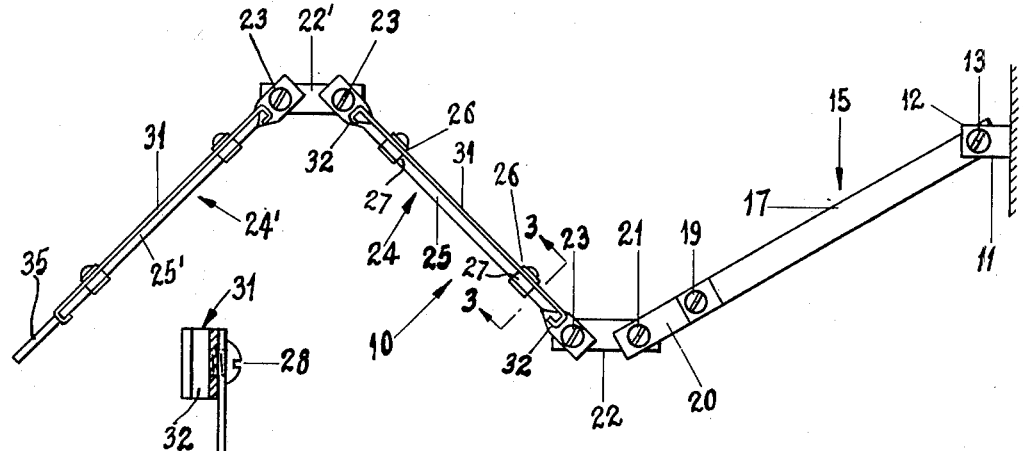
JOHN J. TOMEO
INVENTOR
ATTORNEY

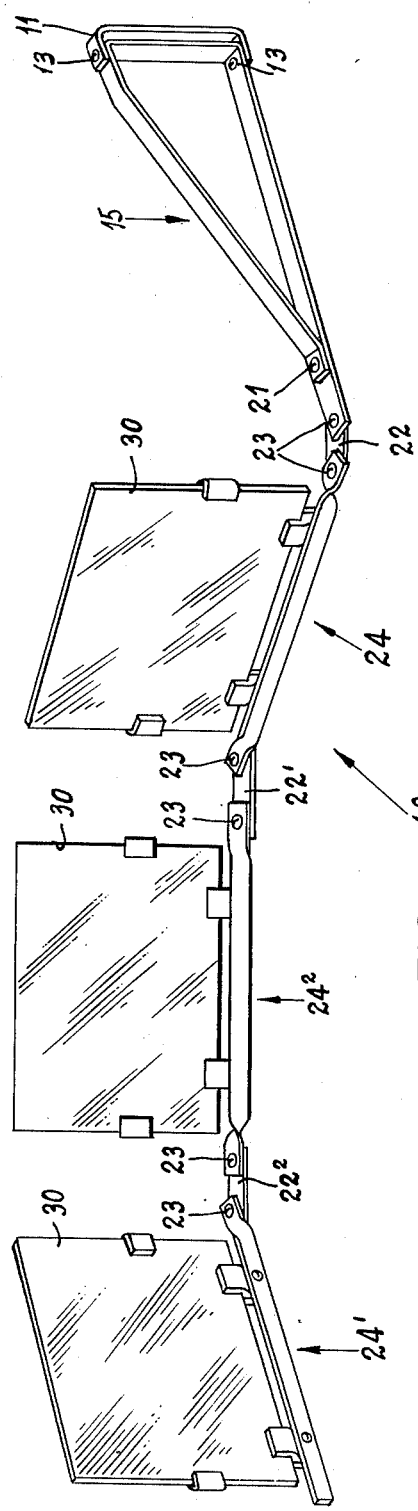

Patented Apr. 1, 1952

2,591,318

UNITED STATES PATENT OFFICE 2,591,318

ADJUSTABLE MIRROR BRACKET

John J. Tomeo, Queens Village, N. Y.

Application August 18, 1950, Serial No. 180,117

1 Claim. (Cl. 88—92)

This invention relates to a mirror-bracket for walls, dressers, bureaus, and the like.

An object of this invention is to improve the construction of adjustable brackets which makes it possible to readily adjust and arrange the mirrors to enable a person to stand between the mirrors and see both sides of the face, the arrangement being such as to dispense with the use of the ordinary hand-mirror and to leave both hands of a person free for dressing.

Another object of this invention is to provide duplex dressing mirrors mounted inside a room near a dresser, and a mounting of rugged construction adapted for universal adjustment in a ready manner.

Another object of this invention is to provide duplex dressing mirrors adapted to fold up into a small space when not in use so as to be easily transported from place to place, and which when set up for use will form a rigid structure.

Another object of this invention is to provide a supporting mechanism for mounting two complemental side mirrors and an intermediate normal mirror for relative pivotal adjustment.

With the above and other objects in view, the invention will be hereinafter more particularly described, and the combination and arrangement of parts will be shown in the accompanying drawings and pointed out in the claim which forms part of this specification.

Reference will now be had to the drawings, wherein like numerals of reference designate corresponding parts throughout the several views, in which:

Figure 1 is a perspective view of the supporting mechanism for mounting mirrors for relative pivotal adjustment.

Figure 2 is a top plan view of the supporting mechanism shown in Figure 1, the mirrors being omitted.

Figure 3 is a cross-sectional view taken on line 3—3 in Figure 2, and shown on an enlarged scale.

Figure 4 is a perspective view of a supporting mechanism for mounting two complemental side mirrors and an intermediate normal mirror for relative pivotal adjustment.

In the illustrated embodiment of the invention, the numeral 10 indicates an adjustable supporting mechanism comprising an upright wall hanger 11 having horizontal arms 12, 12, with aligned screws 13, 13 forming a vertical axis.

An extension bracket 15 of triangular form has one side 16 suitably mounted on the screws 13 and is rotatable thereon.

One side of the triangular bracket 15 provides a brace 17 which is connected to a horizontally disposed supporting arm 18 by a screw 19. The arm 18 has an extension 20 and a screw 21 threaded therein. A common pivotal member 22 is secured to the extension 20 by the screw 21.

A mirror carrying arm 24 comprises a carrier bar 25 one end of which is pivotally secured to the common pivotal member 22 by a screw 23. The carrier bar 25 has two uprights 26, 26 secured thereto. The lower end portions of the uprights 26 are bent upwardly, as shown in Figure 3, to provide a right-angular supporting shelf 27.

A threaded screw 28 holds an upright 26 and its integral shelf 27 in unitary relation with the carrier arm 24. In the preferred embodiment, the shelves 27 are of a size to receive and support the lower edge portion of a mirror 30. At the upper end portions of the uprights 26 is a horizontal connecting bar 31 which is secured to the uprights by threaded screws 28. Each end of the bar 31 is bent to provide a U-shaped portion 32 for receiving the upright side edges of a mirror 30.

A further common pivotal member 22' is pivotally secured to the free end of the carrying arm 24 by a screw 23. A further mirror carrying arm 24' is employed to carry another mirror 30 and comprises a lower bar 25' one end of which is pivotally secured to the common pivotal member 22' by a screw 23.

The construction of the mirror carrying arm 24' is identical with the mirror carrying arm 24 and needs no further description. The only difference is trivial and consists in a linear free end extension 35 of the lower bar 25'.

As shown in Figures 1 and 2, the two complemental mirrors 30 may be adjusted relative to each other with the common pivotal member 22' in the different positions of adjustment. In the position shown in Figure 2, the mirrors are set at equal angles with relation to the pivotal member 22'. The mirrors in the said set position may be moved as a unit in relation to the bracket 15 and to the hanger 11.

It will be noted that the pivotal members 22 and 22' make it possible to fold the complemental dressing mirrors 30 into side-by-side contacting relation and the entire supporting device may be folded into a flat package when not in use.

Figure 4 is a perspective view of an adjustable supporting mechanism 40 for mounting two complemental mirrors 30, 30 and an intermediate normally positioned mirror 30 for relative pivotal adjustment.

The triplex supporting mechanism 40 comprises a wall hanger 11 which pivotally carries a triangular extension bracket 15 on screws 13. The bracket 15 has a common pivotal member 22 secured to the free end thereof by a screw 21.

A mirror carrying arm 24 is pivotally secured to the common pivotal member 22 by a screw 23. The other end of the arm 24 is pivotally secured to a common pivotal member 22' by a screw 23.

A mirror carrying arm $24^2$ is pivotally secured to the common pivotal member 22' by a screw 23. The other end of the arm $24^2$ is pivotally secured to a common pivotal member $22^2$ by a screw 23.

A further mirror carrying arm 24' is pivotally secured to the common pivotal member $22^2$ by a screw 23. It is to be noted that the mirrors 30, 30 carried by the arms 24 and 24' are complemental to each other and are set in equal angular relation with the intermediate mirror 30, the intermediate mirror being set normal to the person using the triplex mirror appliance.

In accordance with the patent statutes I have described and illustrated the preferred embodiment of my invention, but it will be understood that various changes and modifications can be made therein without departing from the spirit of the invention as defined by the appended claim.

I claim:

An adjustable supporting mechanism comprising an upright wall hanger having horizontal arms with aligned screws forming a vertical axis, a triangular extension bracket having one side mounted on said screws and rotatable thereon, said bracket having one horizontally positioned side and a common pivotal member secured thereto, two complemental mirror carrying arms supported by said bracket, a mirror carried by each of said arms and said bracket being pivotally secured to a common pivotal member permitting independent angular adjustment of said mirrors to face each other, whereby a person positioned between said mirrors may see both sides of his face simultaneously each of said carrying arms having a pair of spaced bottom shelves, uprights extending upwardly from the shelves at the same spaced locations thereof, common fastening elements connecting respectively at the respective locations the shelf and the upright and a horizontal connecting bar secured to the upper ends of the uprights and having inwardly bent portions on the respective opposite ends thereof, said shelves and bent portions serving to support and retain said mirrors.

JOHN J. TOMEO.

REFERENCES CITED

The following references are of record in the file of this patent:

UNITED STATES PATENTS

| Number | Name | Date |
|---|---|---|
| 1,106,503 | Fitchet | Aug. 11, 1914 |
| 1,675,383 | Roccaforte | July 3, 1928 |
| 1,723,863 | Jeffrey | Aug. 6, 1929 |
| 2,116,524 | Little | May 10, 1938 |